United States Patent
Antonenco et al.

(10) Patent No.: US 6,622,913 B1
(45) Date of Patent: Sep. 23, 2003

(54) SECURITY SYSTEM FOR PROTECTING VARIOUS ITEMS AND A METHOD FOR READING A CODE PATTERN

(75) Inventors: Alexandru Antonenco, Kishinev (MD); Edward Brook-Levinson, Petah Tikva (IL); Vladimir Manov, Haifa (IL); Evgeni Sorkine, Tel Aviv (IL)

(73) Assignee: Advanced Coding Systems Ltd., Even Yehuda (IL)

( * ) Notice: Subject to any disclaimer, the term of this patent is extended or adjusted under 35 U.S.C. 154(b) by 124 days.

(21) Appl. No.: 09/692,521

(22) Filed: Oct. 20, 2000

(30) Foreign Application Priority Data

Oct. 21, 1999 (IL) ................................................ 132499

(51) Int. Cl.$^7$ ................................................ G06K 7/08
(52) U.S. Cl. ...................... 235/449; 235/450; 235/451; 235/375; 235/493
(58) Field of Search ............................. 235/449, 450, 235/451, 375, 493

(56) References Cited

U.S. PATENT DOCUMENTS

| | | | |
|---|---|---|---|
| 4,883,949 A | 11/1989 | Kokubo et al. | |
| 4,900,976 A * | 2/1990 | Livshultz et al. | 313/402 |
| 5,583,333 A | 12/1996 | Hoshino et al. | |
| 5,594,229 A * | 1/1997 | Hoshino et al. | 235/449 |
| 5,616,911 A | 4/1997 | Jagielinski | |
| 5,801,630 A | 9/1998 | Ho et al. | |
| 6,206,293 B1 * | 3/2001 | Gutman et al. | 235/380 |
| 6,230,972 B1 * | 5/2001 | Dames et al. | 235/449 |
| 6,257,488 B1 * | 7/2001 | Robertson et al. | 235/439 |
| 6,329,916 B1 * | 12/2001 | Dames | 148/304 |

OTHER PUBLICATIONS

"Magnetic Materials" www.consult–g2.com/course/chapter2/chapter.*
Wiesner et al., "Magnetic Properties of Amorphous Fe–P Alloys Containing Ga, Ge and As", *Phys. Stat. Sol.*, (1974), vol. 26, pp. 71–75.
Donald et al., "The preparation, properties and applications of some glass–coated metal filaments prepared by the Taylor–wire process".
A.N. Antonenko et al, "High Frequency Properties of Glass-Coated Microwire", Journal of Applied Physics, vol. 83, No. 11, pp> 6587–6589, 1998.

* cited by examiner

*Primary Examiner*—Michael G. Lee
*Assistant Examiner*—Steven S. Paik
(74) *Attorney, Agent, or Firm*—Browdy and Neimark, P.L.L.C.

(57) ABSTRACT

A reading head is presented for use in a security system for reading an intermittent code pattern, when the code pattern is displaced in a reading direction with respect to the reading head. The code pattern is formed of a plurality of spaced-apart magnetic elements made. The reading head comprises a magnetic material producing a high-gradient static magnetic field, and a sensing element of a kind responsive to signals produced by the magnetic elements. The magnetic material is designed such that it defines an extended narrow region where the static magnetic field vector is substantially equal to zero. The sensing element is located substantially within the zero-field region, and is thereby responsive to signals generated by each of the magnetic elements, when the magnetic element is located in the zero-field region.

13 Claims, 4 Drawing Sheets

SECURITY SYSTEM FOR PROTECTING VARIOUS ITEMS AND A METHOD FOR READING A CODE PATTERN

FIELD OF THE INVENTION

This invention is generally in the field of security techniques, and relates to a security system for encoding documents and other valuable items with code patterns, and a method for reading these code patterns.

BACKGROUND OF THE INVENTION

It is often the case that documents or other valuable items need to be protected from tampering, falsification and unauthorized use. The accepted way of protection consists of introducing one or more security means into, or attaching these means to, a document or an item. The documents and items to be protected include ID cards, passports, licenses, security passes, currency, checks, travel tickets, keys and key cards, and the like. The most widely used encoded security means are so-called "optical bar codes" and magnetic strips. Such encoded security means may be either visible or hidden from view.

Conventional optical bar codes suffer from the drawback associated with the fact that dust or dirt incidentally appearing on either a data recording medium or a data reader device may cause read errors. Additionally, in magnetic strips, the recorded data may be damaged by the influence of an ambient magnetic field or an elevated temperature.

U.S. Pat. No. 4,883,949 discloses a system with increased code reliability. In this system, data recording means are defined by intermittent patterns of different materials that can affect the high frequency impedance of the magnetic coil of a reading head. The pattern materials may differ in electric conductivity and/or magnetic permeability.

Another common drawback of the optical bar codes and magnetic strips, is that they can be easily read out and duplicated by conventional means. To increase the security of important documents and valuable items from unauthorized use or falsification, it was proposed to incorporate a magnetic bar code strip or other pattern hidden within the document or item substrate or concealed under other "dummy" security elements such as optical bar codes or holograms.

In the known devices of the kind specified, magnetic materials were used mostly in the form of magnetic inks containing powders of high magnetic coercivity, e.g., $Fe_{2O3}$, $BaFe_{12}O_{19}$ and the like. However, it is recognized that the strong persisting magnetic field of such materials allows for reading out and duplicating the encoded pattern.

In U.S. Pat. No. 5,616,911, it is proposed that the hidden magnetic bar code pattern be formed using the low concentration magnetic ink exhibiting very low, approximately zero, remanance. Such magnetic inks may be formed from soft magnetic materials including Fe-powder, ferrites, Sendust alloy powder, amorphous alloys in a powder form and the like. The concentration of these materials in an ink or binider medium of less than 10% by volume is preferred. A reading head utilizing an in-field magneto-resistive sensing element is employed to magnetize the bar code pattern bands and detect their width or the space between them, whilst they move with respect to the head. After being read, the code pattern exhibits practically no residual magnetic field and is not readable by a magnetic viewer. One of the disadvantages of the proposed security system is in that the applied soft magnetic powders are easily available and their magnetic signature is not specific, and therefore the document counterfeiting is still possible. Another disadvantage is in that the sensitive area of the reading head with a magneto-resistor sensing element is large. The size of the code pattern elements and the distance between them cannot be smaller than the reading head sensitive area, otherwise these elements would not be unambiguous. Therefore, the information density of such a coding system is intrinsically low. Moreover, the reading head resolution deteriorates strongly with the increase in the distance between the magneto-resistive sensing element reading head and the code pattern. The same is relevant for the bar code system disclosed in the above-indicated U.S. Pat. No. 4,883,949.

U.S. Pat. No. 5,801,630 discloses a method for preparing a magnetic material with a highly specific magnetic signature, namely with a magnetic hysteresis loop having large Barkhausen discontinuity at low coercivity values. This material is prepared from a negative-magnetostrictive metal alloy by casting an amorphous metal wire, processing the wire to form longitudinal compressive stress in the wire, and annealing the processed wire to relieve some of the longitudinal compressive stress. One disadvantage of such material in security pattern applications is the relatively large wire diameter, which is approximately 50 µm. Another disadvantage is the complicated multi-stage process of the wire preparation. Yet another disadvantage of the material is the amorphous wire brittleness which appears due to wire annealing Such brittleness will prevent using the material in security patterns formed in paper documents like currency, checks, passports, etc.

According to another known technique, a glass-coated magnetic microwire is used as a magnetic material having unique magnetic properties. This microwire is cast directly from the melt by a modified Taylor method, which is well known in the art, and is disclosed, for example, in the article of I. W. Donald and B. L. Metcalf *"The Preparation Properties and Applications of Some Glass-Coated Metal Filaments Prepared by the Taylor-Wire Process"*, Journal of Materials Science, Vol. 31, pp 1139–1149, 1996. It is an important feature of the Taylor process that it enables pure metals and alloys to be produced in the form of a microwire in a single operation, thus offering an intrinsically inexpensive method for the manufacture of microwire. The glass-coated microwires can be produced with very small diameters (ranging from 1 µm to several tens micrometers), from a variety of magnetic and non-magnetic alloys and pure metals. Magnetic glass-coated microwires may be prepared also with amorphous metal structures, as disclosed in the article of H. Wiesner and J. Schneider *"Magnetic properties of Amorphous Fe-P Alloys Containing Ga, Ge and As"*, Physica Status Solidi, Vol. 26, pp 71–75, 1974, and other publications cited as references in the above-indicated review of Donald and Metcalf. These amorphous magnetic glass-coated microwires have good mechanical strength, flexibility and corrosion resistance, so that they can be easily incorporated in paper, plastic and other document substrate materials, Amorphous magnetic glass-coated microwires are characterized by their unique response which may resemble, inter alia, that of die-drawn amorphous wires of the above cited US '630.

SUMMARY OF THE INVENTION

There is accordingly a need in the art to improve security systems by providing a novel security system utilizing a code pattern formed by magnetic elements with extremely low coercivity and high permeability, and a novel reading head and method for reading the code pattern.

It is a major feature of the present invention to provide such a system that has a high density magnetic read-only code pattern, which is not visible to the Individual's eyes, and a reading head capable of reading this code pattern It is another feature of the present invention to provide such a reading head that is designed to match the unique response characteristic of the code pattern material.

The main idea of the present invention is based on the following. A read-only code pattern, to be attached to a document that is to be protected, is formed by magnetic elements having extremely low coercivity (substantially less than 10 $\mu$m) and high permeability (substantially higher than 20000). A reading head, in addition to the conventionally used magnetic sensing element (e.g., coils), is provided with a magnetic means (e.g., at least two permanent magnets) creating a static magnetic field of a specific configuration. This static magnetic field, on the one hand, affects the magnetic elements so as to provide their magnetic response to this static filed, and, on the other hand, has such a configuration as to define an extended narrow region (plane) where the static magnetic field vector is substantially equal to zero. The sensing element is located substantially within his zero-field plane. In other words, the magnetic field produced by the magnetic means has a high gradient in the sensitivity zone of the sensing element. Due to the above magnetic characteristics of the magnetic elements, they will produce an effective (noticeable by the sensing element) response only within this narrow (i.e., plane-like) zone, while being saturated by the static magnetic field at any location out of this plane. The magnetic response of these magnetic elements would not be readable with sufficient resolution by the sensing element only, without the use of the high-gradient static magnetic field. Moreover, to read the code pattern, the magnetic elements should be displaced with respect to the sensing element and located outside the magnetic means, provided during this displacement each of the magnetic elements passes the zero-field plane in a reading direction perpendicular to this plane.

The pattern may be representative of a binary code, wherein binary "1" and "0" are defined either by different distances between the adjacent magnetic elements, or by different parameters of the magnetic elements (e.g., materials or dimensions).

There is thus provided according to one aspect of the present invention a security system for protecting an item by forming it with a predetermined code pattern, the system comprising:

(a) a plurality of spaced-apart magnetic elements forming said code pattern, wherein said magnetic elements are made of at least one magnetic material having a coercivity substantially less than 10 $\mu$m and a permeability substantially higher than 20000;

(b) a reading head comprising a sensing element of a kind responsive to signals generated by the magnetic elements, and a magnetic means of a kind producing a high gradient static magnetic field and defining an extended narrow region where the static magnetic field vector is substantially equal to zero, said sensing element being mounted with respect to the magnetic means so as to be located substantially within said region to detect the signals produced by the magnetic elements when they pass said extended narrow region in a reading direction perpendicular to said region; and (c) a detector detecting the response of said sensing element and generating data representative thereof The term "*Hexended narrow region*" used herein signifies a plane-like zone. Generally speaking, the zero-field extended narrow region is located within a plane perpendicular to a reading direction in which the magnetic elements are to be displaced with respect to the reading head. Preferably, the zero-field region, a sensing area, is less than 50 $\mu$m in the axis along the reading direction.

The sensing element may be a conventional magnetic head, e.g., a coil wound onto a core, or a magnetoresistor element. The magnetic means producing the high gradient static magnetic field may include at least two spaced-apart permanent magnets. The magnets are oriented with respect to each other such that their axes of magnetization are aligned in a spaced-apart parallel relationship, and each pole of one permanent magnet faces an opposite pole of the other permanent magnet.

The magnetic elements are, preferably, glass-coated microwires, which may be produced in a one-stage casting process from an alloy having substantially zero magnetostriction. Preferably, the alloy is cobalt based, including more than 70% cobalt by atomic percent.

The microwires have very small diameters, so that they can be embedded into the document substrate without causing noticeable changes in the document thickness or form. The position of the microwires in the document cannot be detected visually or by touch. The code pattern formed by microwires is not visible with the magnetic viewer, owing to the fact that the microwire is a soft magnetic material and demonstrates a very low remanence. The microwire pattern density is considerably higher than that obtained with the known magnetic materials like magnetic inks. The microwire code pattern cannot be read with known readers, including those which detect soft magnetic materials, since the sensing area of known readers is much larger than the distance between the microwire pieces in the code pattern of the present invention. The microwire code pattern can be read only and solely with a specific reader device (reading head) according to the present invention. Hence, the microwire code pattern increases substantially the document security.

The code pattern may be attached directly to the item, or to a separate label attached to the item.

According to another aspect of the invention, there is provided a reading head for reading an intermittent code pattern formed of a plurality of spaced-apart magnetic elements made of at least one magnetic material, when the magnetic elements are displaced in a reading direction with respect to the reading head, the reading head comprising:

a magnetic means producing a high gradient static magnetic field defining an extended narrow region where the static magnetic field vector is substantially equal to zero; and a sensing element mounted with respect to the magnetic means so as to be located substantially within the zero-field region, the sensing element being thereby responsive to signals generated by the magnetic elements, when each of the magnetic elements, while being displaced in said reading direction, is located in said zero-field region.

According to yet another aspect of the present invention, there is provided a method for reading a code pattern formed by a plurality of spaced-apart magnetic elements made of at least one magnetic material having a coercivity substantially less tan 10 A/m and a permeability substantially higher than 20000, the method comprising the steps of:

(i) creating a static magnetic field with substantially high gradient, such that the static magnetic field vector is substantially equal to zero within an extended narrow region;

(ii) providing a sensing element of a kind responsive to signals generated by the magnetic elements and locating said sensing element substantially wit the zero-field region;

(iii) providing relative displacing of the code pattern relative to said sensing element in a reading direction perpendicular to said extended narrow region, such that the code pattern passes through said static magnetic field, thereby exciting each of the magnetic elements to generate the signals whilst passing the zero-field region; and (iv) detecting the response of the sensing element to said signals generated by the magnetic elements.

BRIEF DESCRIPTION OF THE DRAWINGS

The present invention may be more fully understood from the descriptions of preferred embodiments of the invention set forth below, together with accompanying drawings, in which:

FIG. 1 is a schematic illustration of a security system according to the

DETAILED DESCRIPTION OF THE PREFERRED EMBODIMENTS

Figure 1:
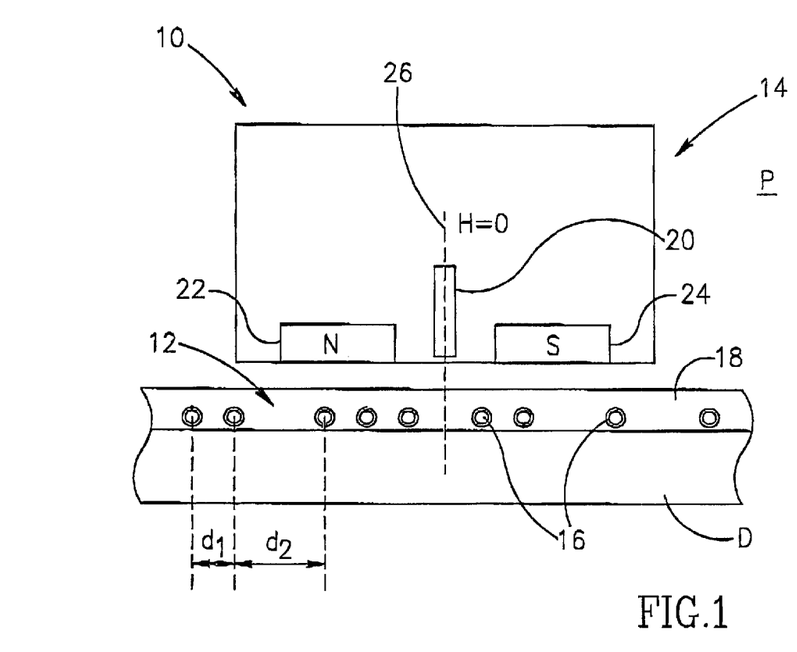

Referring to FIG. 1, there is illustrated a security system 10 having such main constructional parts as a magnetic marker or code pattern 12 and a magnetic reading head 14. The code pattern 12 is formed by a set of glass-coated magnetic microwires 16 aligned in a spaced-apart parallel relationship along the surface region of a document-substrate D covered by an obscuring layer 18. The microwires 16 (pieces) are either attached to the document (or item) itself or are contained in a label attached to the item. The reading head 14 comprises a sensing element 20, whose construction and operation will be described more specifically further below. As the reading head 14 passes over the microwire code pattern 12, each microwire piece 16 produces a specific response, which is detected by the sensing element 20.

In this specific example, the code pattern 12 is formed by several 8 mm-length microwire pieces 16 with different spaces between them, namely $d_1$ of 0.2 mm and $d_2$ of 0.5 mm. Generally, security information (code) may be written in a binary form, for example, by establishing two different distances $d_i$ and $d_2$ between the microwire pieces 16. The shorter distance di may be interpreted as binary "0", and the larger distance $d_2$ as binary "1", or vice versa. While the reading head 14 passes over the microwire pattern 12 at a constant speed, the time intervals between the detected microwire responses precisely correspond to the distances between the microwire pieces 16.

It should be noted, although not specifically shown, that the code information may be written in a binary form by using the microwire pieces 16 of two different types. These different microwires may have different diameters or permeabilities, so that they produce considerably different responses to a magnetic field produced by the reading head 14. Accordingly, one type of the microwires may present binary "0" and the other binary "1".

Figure 2:
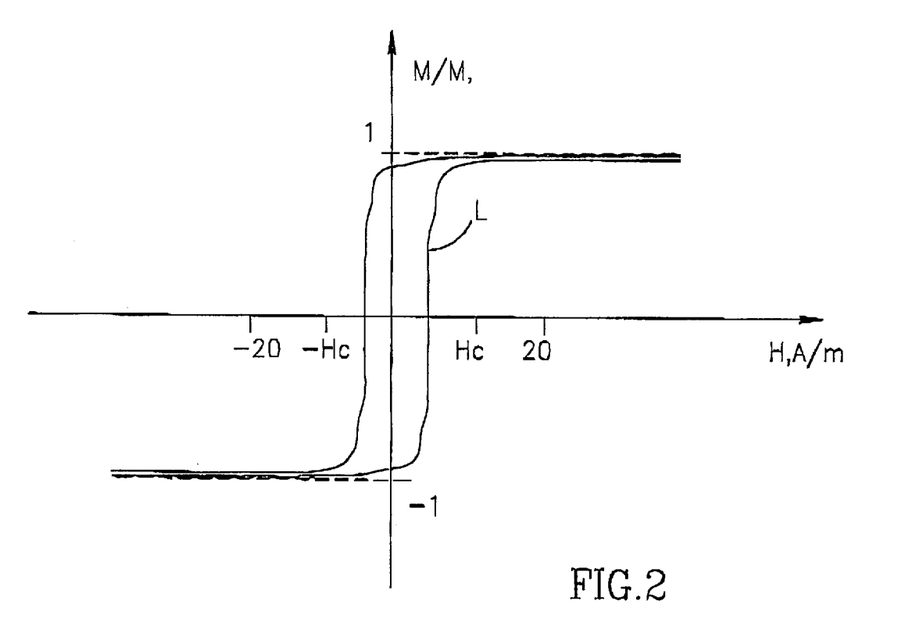
FIG. 2 graphically illustrates the magnetic characteristics of magnetic elements suitable to be used in a marker of the system of FIG. 1.

The microwires 16 are manufactured from the Co-Fe-Si-B alloy containing 77.5% Co, 4.5% Fe, 12% Si and 6% B by atomic percentage. The outer diameter of the microwire 16 is about 20 µm, and its metal core diameter is about 15 µm. A measured hysteresis curve H of the microwire material is shown in FIG. 2. The hysteresis loop L has a small coercivity value $H_c$, which is less than 20 A/m (generally less than 10 A/m), a large Barkhausen discontinuity (i.e., high permeability value, i.e., higher than 20000), and the saturation induction value B equal to 0.8T.

Generally, for the purposes of the present invention, the coercive force values are in the range of 5–10 A/m (0.06–0.12 Oe). In other words, a glass-coated magnetic microwire material to be used for the preparation of the code pattern should be characterized by small magnetic coercivity and high permeability values. Such a microwire can be fabricated from amorphous alloys having approximately zero magnetostriction. This technique has been developed by the inventors of the present application, and is disclosed in the article "*High Frequency Properties of Glass-Coated Microwire*", A. N. Antonenko, E. Sorkine, A. Rubshtein, V. S. Larin and V. Manov, Journal of Applied Physics, Vol. 83, No. 11, 1998, pp. 6587–-6589. To is end, an alloy containing 77.5% Co, 4.5% Fe, 12% Si and 6% B by atomic percentage may be used.

Turning back to FIG. 1, the reading head 14 comprises two or more permanent magnets—two such magnets 22 and 24 in the present example (constituting a magnetic means). The magnets 22 and 24 are arranged in a spaced-apart parallel relationship, being oriented with respect to each other such that their magnetization directions are perpendicular to a plane P (i.e., the plane of the drawing). The poles orientation of the magnet 22 is inverse to that of the magnet 24. In other words, the axes of magnetization of the magnets 22 and 24 are aligned in a spaced-apart parallel relationship, and each pole of one magnet faces the opposite pole of the other magnet. Therefore, a plane 26 exists between the magnets 22 and 24, in which the induction of the sum (interpolated) static magnetic field vector created by both magnets is equal to zero. The sensing element 20, which is responsive to the microwire magnetic response, is secured in such a position that the zero-field plane 26 passes therethrough. It should be noted that the sensing element may and may not be accommodated between the permanent magnets, provided that it is located in the plane 26.

Figure 3:
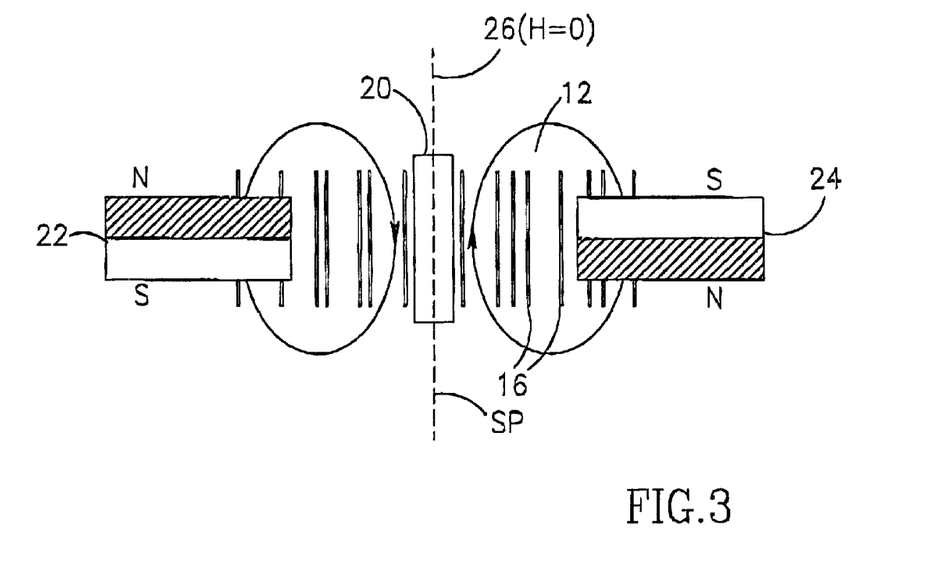
FIG. 3 more specifically illustrates the layout of the magnetic elements and reading head in the system of FIG. 1.

FIG. 3 schematically illustrates the layout of the system 10. The permanent magnets 22 and 24 are preferably identical in size and magnetization value, and are aligned in a line in a manner to create the zero-field plane 26 between the magnets 22 and 24. The sensing element 20 is accommodated such that the zero-field plane preferably coincides with a symmetry plane SP of the sensing element 20. The magnetic field lines configuration for both magnets is partly shown in the figure.

Figure 4:
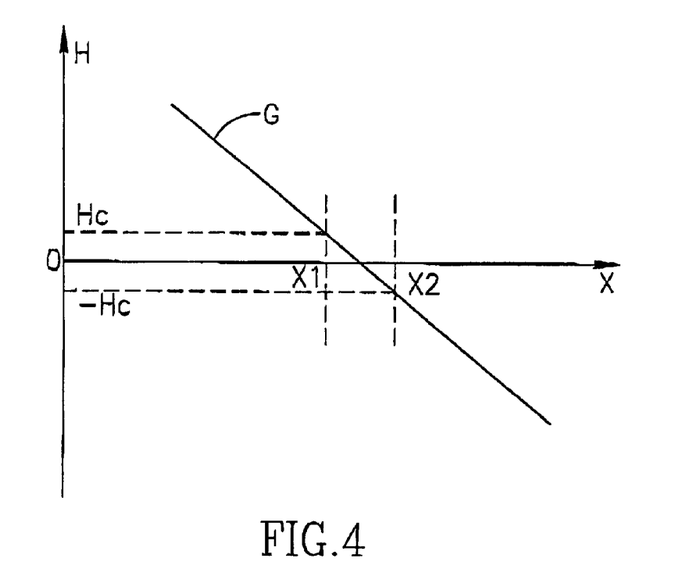
FIG. 4 graphically illustrates the main operational principles of the system of FIG. 1.

FIG. 4 illustrates the main principles of locating the microwire 16 (i.e., detecting its presence and determining its position) by the gradient of the magnetic field created by the permanent magnets 22 and 24. A graph G presents the distribution of the intensity H of the static magnetic field of the permanent magnets along the x-axis, which is the axis along which the reading is carried out (i.e., the axis of movement of the reading head with respect to the pattern), In the vicinity of the zero-field plane 26 (FIG. 3), the magnetic field intensity H actually presents a linear function of the distance relative to the plane 26 along the x-axis.

It is generally known that the microwire of the type selected for the purposes of the present invention is highly anisotropic and provides a noticeable response only to a magnetic field directed along the microwire axis (perpendicular to the x-axis). As indicated above, the microwire hysteresis loop is nearly rectangular, and therefore it will be saturated whenever the external magnetic field intensity exceeds the microwire coercivity value $H_c$. To this end, the intermittent code pattern 12 and the reading head 14 should be oriented with respect to each other daring the reading process such that the microwire pieces 16 are substantially parallel to the zero-field plane 26 and are displaced in a reading direction perpendicular to the plane 26. In this orientation, the given microwire piece will be noticed by the sensing element 20, only when the microwire piece 16 is positioned within the internal $\{x_1, x_2\}$, where the intensity of the magnetic field created by the permanent magnets is less than $H_c$.

Figure 5:
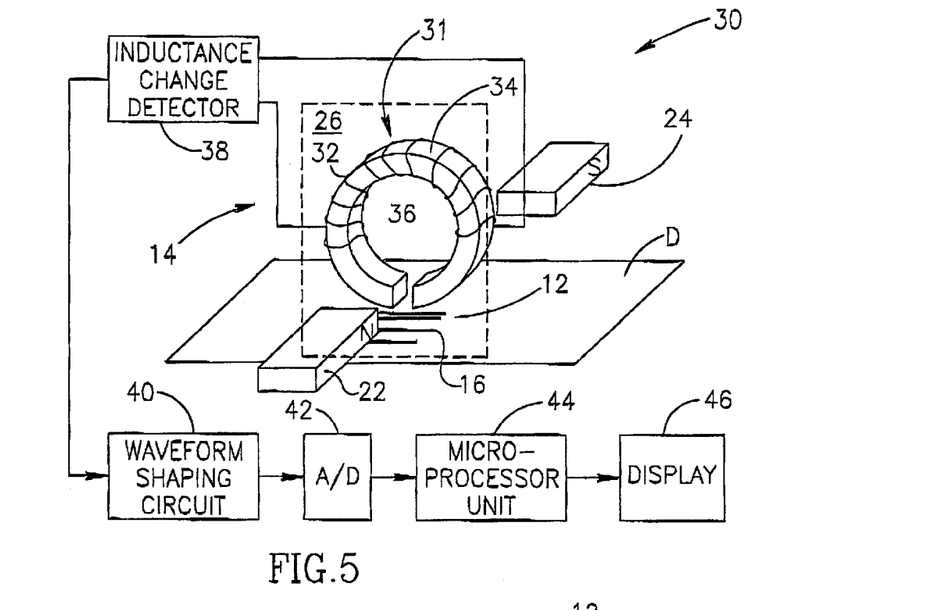
FIG. 5 illustrates one possible example of the implementation of the reading head suitable to be used in the security system of FIG. 1.

Reference is made to FIG. 5, illustrating a security system 30 utilizing a sensing element of an inductive type. To facilitate understanding, same reference numbers are used for identifying those components, which are identical in the systems 10 and 30. Thus, the system 30 comprises the reading head 14 and the microwire-based code pattern 12 attached to the item D. An indicative sensing element 31 of the reading head 14 is in the form of a coil 32 wound on a ring-like core 34 made from a soft magnetic material, e.g., fentite. As shown, spaced-apart ends of the core 34 form an air gap 36 therebetween. An inductance change detector 38 supplies high frequency alternating current to the coil 32. When the microwire piece 16 of the intermittent code pattern 12 approaches the air gap 36, it lowers the gap reluctance causing the corresponding change in the inductance of the coil 32, which is detected by the inductance change detector 38. By moving the reading head 14 with the inductive sensing element 31 relative to the pattern 12, and by analyzing the corresponding inductance changes of the coil 32, the position of the microwire pieces 16 in the pattern 12 can be detected.

The coil 32 is placed in the plane 26 where the intensity of the static magnetic field vector created by the permanent magnets 22 and 24 is close to zero, While the reading head 14 passes over the microwire code pattern 12, the microwire pieces 16 successively enter the strong magnetic field created by the permanent magnets 22 and 24. This strong magnetic field saturates the microwire pieces, so that they do not produce any change in the impedance of the coil 32 until the microwire piece 16 enters a very narrow region where the magnetic field intensity is between $(-H_c)$ and $(H_c)$. Only in this narrow region (about 50 $\mu$m), the microwire piece 16 will produce a response, and the impedance of the coil 32 will be affected (i.e., lowered) so as to be detected by the detector 38.

The output of the induction change detector 38 may be in the form of high frequency alternating voltage with variable amplitude proportional to the inductance of the coil 32. As further shown in FIG. 5, connected to the detector 38 is a waveform shaping circuit 40 that transforms the high frequency signal into a low frequency signal proportional to the amplitude of the high frequency signal. This low frequency signal is transmitted to an analog-to-digital converter 42, and the digital output is further processed by a processing unit 44. The results of the code analysis may be presented on a display 46, or supplied to an external computer (not shown).

In this specific example, the reading head 14 comprises two identical FeNdB permanent magnets 22 and 24, each with a 3 mm length, a 1 mm height, and a 2 mm width. The magnets have the remanence induction of 1.2T. The distance a between the magnets is 4 mm. The inductance coil 32 is fabricated by winding 500 turns of a 0.05 mm copper wire on a 3F3 Phillips ferrite ring core with a 6 mm outer diameter, a 4 mm inner diameter, and a 2 mm width. The 1 mm air gap 36 is made between the core's ends, The coil 32 is supplied with a 100 kHz, 3V alternating voltage.

It is an important feature of the present invention that the reading head 14 allows for reading the code pattern 12 formed of glass-coated microwires at a considerable distance between the reading head 14 and the code pattern 12. This is due to the fact that the substantially zero-field region extends along the plane between the magnets, rather than being a small region within a physical gap between the magnets. The code pattern 12 to be read need not be moved through the gap between the magnets, but is displaced with respect to the reading head outside this gap. The resolution of responses coming from adjacent microwire pieces 16 does not depend substantially on the distance between the reading head 14 and the code pattern 12. The code pattern 12 is read reliably when this distance varies from 0.05 to 1 mm, as will be described more specifically fiber below.

Figure 6:
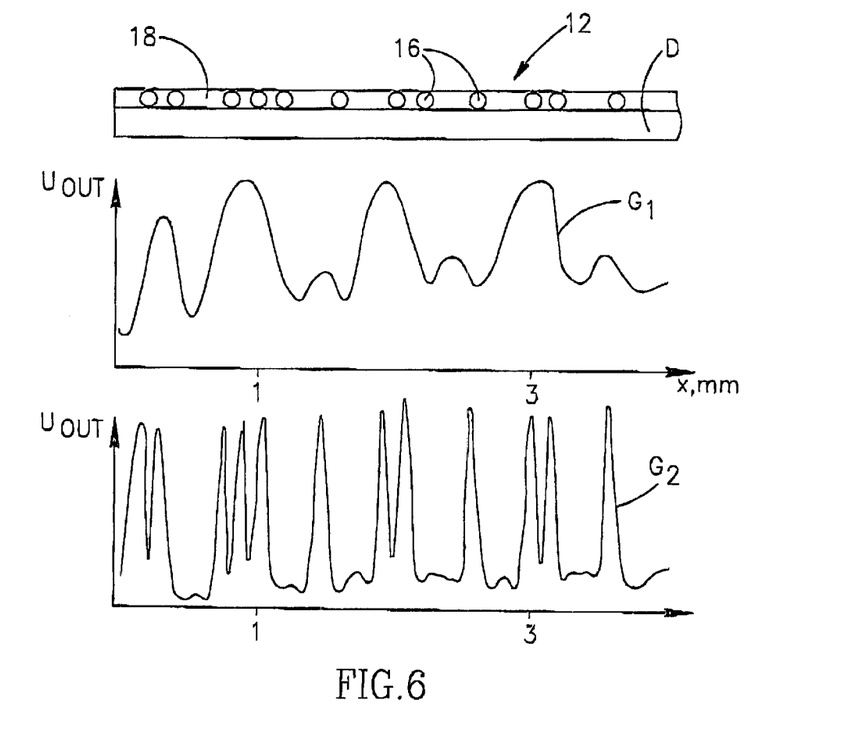
FIG. 6 graphically illustrates advantageous features of the present invention, as compared to a conventional one.

To more clearly demonstrate the principally different performance of the impedance changes based reading head 14 utilizing the permanent magnets 22 and 24, let us compare the operation of this reading head to a reading head (not shown) having the coil 32 and no permanent magnets, both being applied to the same glass-coated microwire based code pattern. As indicated above, the provision of the permanent magnets creates the zero-field region to be passed by the microwire pieces. Hence, what we are actually comparing, are the operation of the reading head in the presence and in the absence of the zero-passing field created by the permanent magnets 22 and 24. FIG. 6 shows the item D with the code pattern 12, and graphically illustrates the main principles of the operation of the system 30. Two graphs $G_1$, and $G_2$ present the output signal $U_{OUT}$ of the waveform shaping circuit 40 (FIG. 5), both measured at the coil's location close to the pattern (e.g., about 30 $\mu$m). Graph $G_1$ corresponds to the signal recorded whilst passing the reading head with the coil 32 only (i.e., having no permanent magnets) over the microwire code pattern 12. Graph $G_2$ corresponds to the signal recorded whilst passing the reading head 14 (with the coil 32 and permanent magnets 22 and 24) over the pattern 12.

It is clear from graph $G_1$, that when using the reading head having no permanent magnets (i.e., having no zero-field region), the sensor resolution is insufficient for the pattern reading. Experiments have shown that when the distance between the air gap and the microwire pieces increases to 0.3 mm and more, it becomes impossible to detect the response of the microwires from the sensor output. On the contrary, when using the reading head 14 constructed as described above (i.e., with the permanent magnets 22 and 24), sharp peaks in the sensor output are detected (graph $G_2$), each sharp peak corresponding to each microwire position in the scanned code pattern 12. When moving the reading head away from the pattern to a distance of 0.5 mm, the amplitude of the output signal decreases by 30%, while the form of the peaks remain unchanged.

The above performance of the reading head 14 can be easily understood in terms of the above considerations regarding the microwire response in the vicinity of the zero-field plane 26. Indeed, the measured field gradient of the reading head sample 14 at the zero-field plane is approximately 40 Oe/mm, whereas the microwire piece coercivity value H, is less than 0.2 Oe. This means that the microwire pieces 16 are not saturated only if they are located at a distance of 5 μm or less from the zero-field plane 26, that is the resolution of the head sample being about 10 μm.

Figure 7:
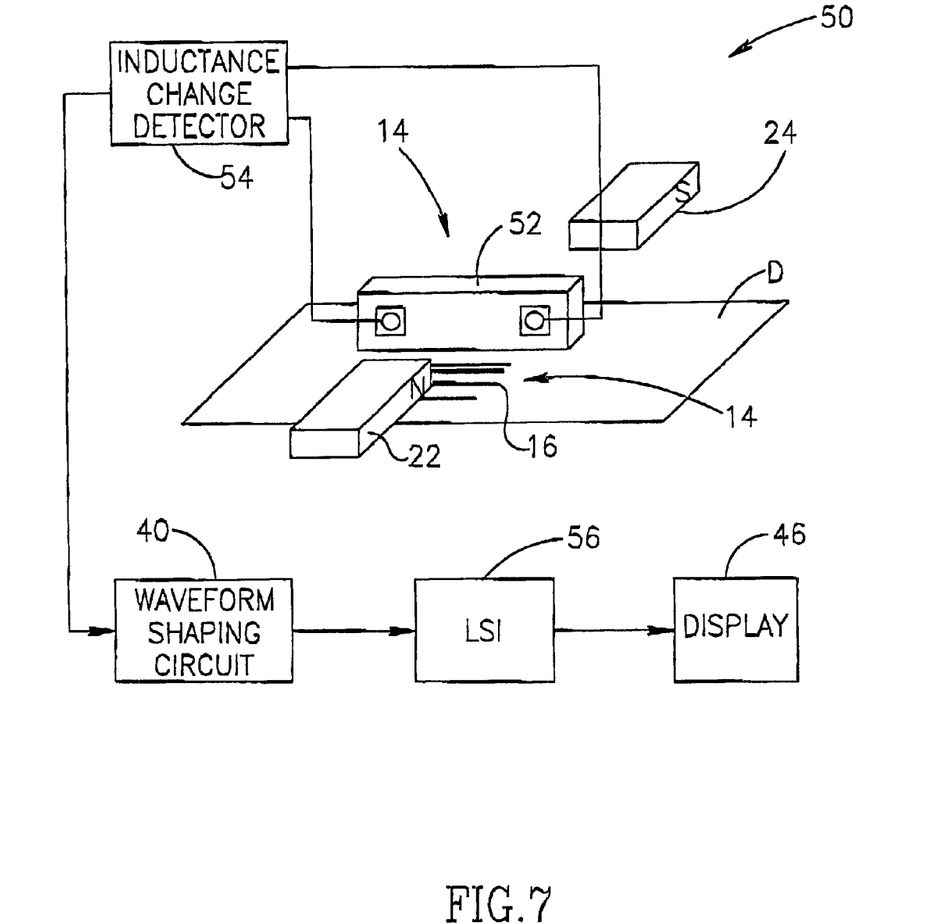
FIG. 7 illustrates another possible example of the implementation of the reading head suitable to be used in the security system of FIG. 1.

Reference is now made to FIG. 7, illustrating, by way of a block diagram, a security system 50, which is constructed generally similar to the above-described system 30, but has a somewhat different design of its sensing element 52, which is of a magnetoresistor type. Similarly, those components, which are common in the systems 30 and 50, are identified by the same reference numbers. The output circuit of the magnetoresistor element 52 is coupled to a resistance change detector 54, which, in turn, may be connected to the waveform shaping circuit 40, if necessary. The output signal of the circuit 40 is then processed, for example, by a custom LS1 unit 56, and the code analysis results may be represented on the display 46.

When the reading head 14 moves with respect to the intermittent code pattern 12, the gradient of the magnetic field created by the permanent magnets 22 and 24 causes re-magnetization of each microwire piece 16 after its passage through the zero-field plane 26. It is generally known in the art, that the re-magnetization of microwire having large Barkhausen discontinuity, i.e., like to those needed for the purposes of the present invention, occurs within a microseconds time period producing a sharp magnetic field pulse. The magnetoresistor element 52 is secured in the zero-filed plane 26, and, consequently, is not affected by the permanent magnetic field produced by the magnets 22 and 24. On the contrary, the magnetic field perturbations caused by the magnetization reversals of the microwire pieces 16 will be sensed by the magnetoresistor element 52, and then detected by the resistance change detector 54.

Those skilled in the art will readily appreciate that various modifications applied to the preferred embodiment of the invention as hereinbefore exemplified, without departing from its scope defined in and by the appended claims.

What is claimed is:

1. A security system for protecting an item by forming it with a predetermined code pattern, the system comprising:
    a plurality of space-apart magnetic elements forming said code pattern, wherein said magnetic elements are made of at least one magnetic material having a coercivity substantially less than 10 A/m and a permeability substantially higher than 20000;
    a reading head comprising:
        a magnetic means comprising two permanent magnets magnetized in opposite directions and arranged in a spaced-apart parallel relationship along an axis perpendicular to the magnetization axes, said magnetic means producing a high gradient static magnetic field defining an extended narrow region, which is located between the permanent magnets and extends parallel to said magnetization axes, and in which the static magnetic field vector is substantially equal to zero, to thereby effect the magnetic element located within the static magnetic field outside the zero-field region; and
        a sensing element being mounted substantially within said region and operable to be responsive to signals generated by the magnetic element that has been affected by the static magnetic field and is located within said extended narrow region being oriented substantially parallel to said region, and
    a detector detecting the response of said sensing element and generating data representative thereof the system being thereby capable of detecting the code pattern during a relative displacement between the magnetic elements and the sensing element in a reading direction perpendicular to the longitudinal axis of the magnetic element, when the magnetic elements successively pass said zero-field region with the magnetic elements' orientation substantially parallel to the narrow zero-field region.

2. The system.according to claim. 1, wherein said pattern presents a binary code formed by different distances between two locally.adjacent magnetic elements.

3. The system according to claim 1, wherein said pattern presents a binary code formed by making the magnetic elements from different materials.

4. The system according to claim 1, wherein said sensing element is a coil wound onto a core.

5. The system according to claim 1, wherein said sensing element is a magnetoresistor element.

6. The system according to claim 1, wherein said magnetic means comprises at least two spaced-apart parallel permanent magnets oriented such that the axes of magnetization of the magnets are aligned in a spaced-apart parallel relationship, and each pole of one of the permanent magnets faces the opposite pole of the other permanent magnet.

7. The system according to claim 1, wherein said magnetic elements are glass-coated microwires.

8. The system according to claim 9, wherein the magnetic material of said glass-coated microwires is produced by a one-stage casting process from an alloy having substantially zero magnetostriction.

9. A reading head for reading an intermittent code pattern formed of a plurality of spaced-apart magnetic elements made of at least one magnetic material, when the magnetic elements are displaced in a reading direction with respect to the reading head, the reading head comprising:
    a magnetic means comprising two permanent magnets magnetized in opposite directions and arranged in a spaced-apart parallel relationship along an axis perpendicular to the magnetization axes, said magnetic means producing a high gradient static magnetic field defining an extended narrow region, which is located between the permanent magnets and extends parallel to said magnetization axes, and in which the static magnetic field vector is substantially equal to zero; and
    a sensing element mounted substantially within the zero-field region, to be responsive to signals generated by the magnetic elements, which has been affected b the static magnetic field and is located in the zero field region with the magnetic element orientation substantially parallel to said zero-field region, the reading head being thereby capable of reading the code pattern, when, during a relative displacement between the magnetic elements and the sensing element, in a reading direction perpendicular to the longitudinal axis of the magnetic element, the magnetic elements successively pass said zero-field region with the magnetic elements' orientation substantially parallel to the zero-field region.

10. A method for reading a code pattern formed by a plurality of spaced-apart magnetic elements made of at least one magnetic material having a coercivity substantially less than 10 A/m and a permeability substantially higher than 20000, the method comprising:

creating a static magnetic field with a configuration defining a substantially high gradient, such that an extended narrow region exists in which the static magnetic field vector is substantially equal to zero, said static magnetic field being capable of affecting the magnetic element located within the static magnetic field outside the zero-field region;

providing substantially within said zero-field region a sensing element responsive to signals generated by the magnetic elements;

providing relative displacement between the core pattern and said sensing element in reading direction perpendicular to the longitudinal axis of the magnetic element with the magnetic elements' orientation substantially parallel to said extended narrow zero-field region, such that the magnetic elements, that have been affected by said static magnetic field, successively pass through the zero-field region, thereby allowing each of the magnetic elements to generate the signals whilst being located in the zero-field region; and detecting the response of the sensing element to said signals generated by the magnetic elements.

11. A security system for protecting an item by forming it with a predetermined code pattern, the system comprising:

a plurality of spaced-apart magnetic elements forming said code pattern, wherein said magnetic elements are glass-coated microwires with a core made of at least one magnetic material having a coercivity substantially less than 10 A/m and a permeability substantially higher than 20000;

a reading head comprising a sensing element of a kind responsive to signals generated by the magnetic elements, and a magnetic means of a kind producing a high gradient static magnetic field and defining an extended narrow region where the static magnetic field vector is substantially equal to zero, said sensing element being mounted with respect to the magnetic means so as to be located substantially within said region to detect the signals produced by the magnetic elements when they pass said extended narrow region in a reading direction perpendicular to said region; and a detector detecting the response of said sensing element and generating data representative thereof.

12. A security system for protecting an item by forming it with a predetermined code pattern, the system comprising:

a plurality of spaced-apart magnetic elements forming said code pattern, wherein said magnetic elements are glass-coated microwires with a core made of at least one magnetic material having a coercivity substantially less than 10 A/m and a permeability substantially higher than 20000, and being produced by a one-stage casting process from an alloy having substantially zero magnetostriction;

a reading head comprising a sensing element of a kind responsive to signals generated by the magnetic elements, and a magnetic means of a kind producing a high gradient static magnetic field and defining an extended narrow region where the static magnetic field vector is substantially equal to zero, said sensing element being mounted with respect to the magnetic means so as to be located substantially within said region to detect the signals produced by the magnetic elements when they pass said extended narrow region in a reading direction perpendicular to said region; and a detector detecting the response of said sensing element and generating data representative thereof.

13. A method for reading a code pattern formed by a plurality of spaced-apart magnetic elements made of at least one magnetic material having a coercivity substantially less than 10 A/m and a permeability substantially higher than 20000, the method comprising:

creating a static magnetic field with a configuration defining a substantially high gradient, such that an extended narrow region exists in which the static magnetic field vector is substantially equal to zero, said static magnetic field being capable of affecting the magnetic element located within the static magnetic field outside the zero-field region, and enabling the magnetic element that has been affected by said static magnetic field to generate a response signal whilst being located in the zero-field region; and sequentially sensing the responses of the magnetic elements forming the code pattern during a relative displacement between the code pattern and said extended narrow zero-field region in a reading direction perpendicular to the longitudinal axis of the magnetic element with the magnetic elements' orientation substantially parallel to said extended narrow zero-field region.

* * * * *